US012566079B2

(12) United States Patent
Nayak et al.

(10) Patent No.: US 12,566,079 B2
(45) Date of Patent: Mar. 3, 2026

(54) APPARATUS AND METHODS FOR PROVIDING A TILE MAP INCLUDING A BINARY REPRESENTATION OF A WEATHER-BASED HAZARD

(71) Applicant: HERE GLOBAL B.V., Eindhoven (NL)

(72) Inventors: Amarnath Nayak, Mumbai (IN); Leon Stenneth, Chicago, IL (US); Alex Averbuch, Buffalo Grove, IL (US)

(73) Assignee: HERE GLOBAL B.V., Eindhoven (NL)

( * ) Notice: Subject to any disclaimer, the term of this patent is extended or adjusted under 35 U.S.C. 154(b) by 336 days.

(21) Appl. No.: 17/944,163

(22) Filed: Sep. 13, 2022

(65) Prior Publication Data

US 2024/0085214 A1     Mar. 14, 2024

(51) Int. Cl.
*G01C 21/00*          (2006.01)
*G01W 1/10*           (2006.01)

(52) U.S. Cl.
CPC ..... *G01C 21/3881* (2020.08); *G01C 21/3815* (2020.08); *G01W 1/10* (2013.01)

(58) Field of Classification Search
None
See application file for complete search history.

(56) References Cited

U.S. PATENT DOCUMENTS

| | | | | |
|---|---|---|---|---|
| 10,431,122 | B2 * | 10/2019 | Harrower | ........... G01C 21/3867 |
| 11,227,420 | B2 | 1/2022 | Raut et al. | |
| 2011/0307168 | A1 | 12/2011 | Kieff | |
| 2019/0316925 | A1 | 10/2019 | Jang et al. | |
| 2019/0353499 | A1 * | 11/2019 | Stenneth | ............. G06F 3/04817 |
| 2020/0356596 | A1 * | 11/2020 | Lu | ........................... G06F 16/29 |
| 2021/0108942 | A1 | 4/2021 | Stenneth | |

FOREIGN PATENT DOCUMENTS

JP          2019060776 A      4/2019

* cited by examiner

*Primary Examiner* — Christian Chace
*Assistant Examiner* — Ai K Tran
(74) *Attorney, Agent, or Firm* — Peter H. Yu; HERE GLOBAL B.V.

(57)          ABSTRACT

An apparatus, method and computer program product are provided for providing a the map including a binary representation of a weather-based hazard. In one example, the apparatus receives data indicating a polygon defining a region being impacted by a weather condition and overlays the polygon on a tile map. The apparatus receives attribute data indicating one or more functional classes of one or more road portions within each tile of the tile map that is partially covered by the polygon and determines a subset of tiles within the tile map that defines the weather condition based on the attribute data.

13 Claims, 9 Drawing Sheets

300

FIG. 2
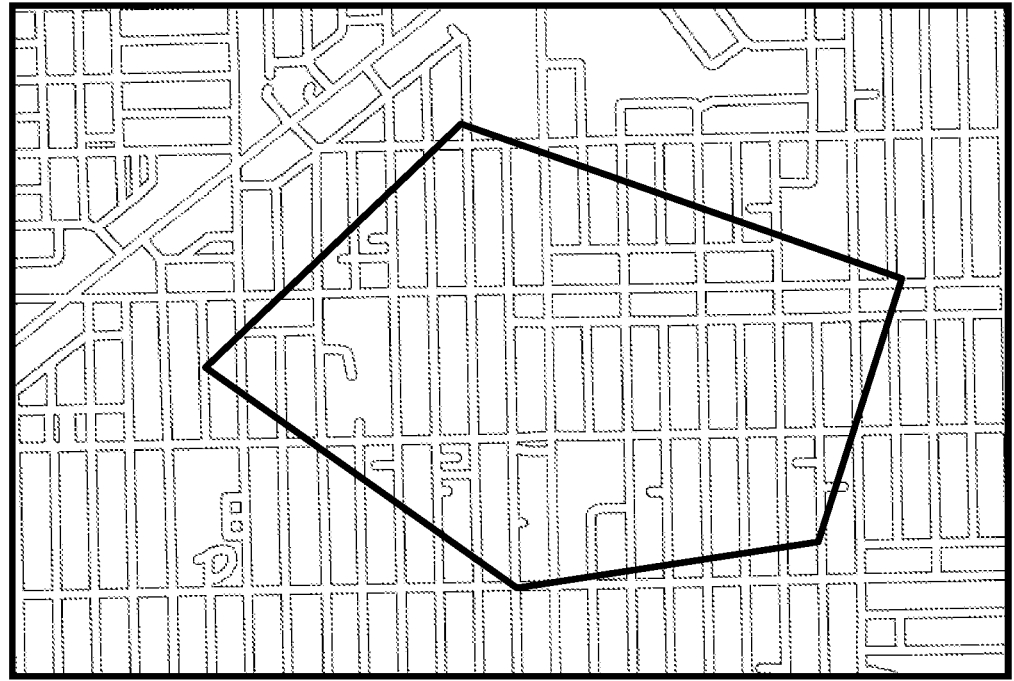

FIG. 6　　　　　　　　　　　　　　　　　500

START

601　RECEIVING DATA INDICATING A POLYGON DEFINING A
REGION BEING IMPACTED BY A WEATHER CONDITION

603　OVERLAYING THE POLYGON ON A TILE MAP

605　RECEIVING DATA ASSOCIATED EACH TILE OF THE TILE MAP
THAT IS PARTIALLY COVERED BY THE POLYGON

607　DETERMINING A SUBSET OF TILES WITHIN THE TILE MAP
THAT DEFINES THE WEATHER CONDITION BASED ON THE
DATA

END

800

APPARATUS AND METHODS FOR PROVIDING A TILE MAP INCLUDING A BINARY REPRESENTATION OF A WEATHER-BASED HAZARD

TECHNICAL FIELD

The present disclosure generally relates to the field of map data analysis, associated methods and apparatus, and in particular, concerns, for example, an apparatus configured to provide one or more tiles within a tile map that include a binary representation of a weather-based hazard by comparing the tile map and a polygon representing the weather-based hazard and analyzing attributes associated with the tile map.

BACKGROUND

Legacy map-based systems utilize polygons to represent certain events, such as weather-based hazards, that are occurring within a region. Recently, polygon-based map systems are being converted to tile-based map systems since tiles within tile-based map systems can be easily adapted for parallel processing systems. However, due to the nature of the polygons, one or more tiles within the tile-based map systems may be partially covered by the polygons, thereby necessitating determination of whether such tiles should be labelled to define the events. Rendering such determination is crucial since labelling said tiles to misrepresent the events lowers the quality of tile maps provided to consumers.

The listing or discussion of a prior-published document or any background in this specification should not necessarily be taken as an acknowledgement that the document or background is part of the state of the art or is common general knowledge.

BRIEF SUMMARY

According to a first aspect, an apparatus comprising at least one processor and at least one non-transitory memory including computer program code instructions is described. The computer program code instructions, when executed, cause the apparatus to: receive data indicating a polygon defining a region being impacted by a weather condition; overlay the polygon on a tile map; receive attribute data indicating one or more functional classes of one or more road portions within each tile of the tile map that is partially covered by the polygon; and determine a subset of tiles within the tile map that defines the weather condition based on the attribute data.

According to a second aspect, a non-transitory computer-readable storage medium having computer program code instructions stored therein is described. The computer program code instructions, when executed by at least one processor, cause the at least one processor to: receive data indicating a polygon defining a region being impacted by a weather condition; overlay the polygon on a tile map; receive sensor data indicating an intensity level of the weather condition from a sensor located within each tile of the tile map that is partially covered by the polygon; and determine a subset of tiles within the tile map that defines the weather condition based on the intensity level.

According to a third aspect, a method of providing a tile map is described. The method includes: receiving data indicating a polygon defining a region being impacted by a weather condition; overlaying the polygon on the tile map; receiving attribute data indicating one or more functional classes of one or more road portions within each tile of the tile map that is partially covered by the polygon; determining a subset of tiles within the tile map that defines the weather condition based on the attribute data; and generating a signal that provides the subset on a user interface.

Also, a computer program product may be provided. For example, a computer program product comprising instructions which, when the program is executed by a computer, cause the computer to carry out the steps described herein.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

The steps of any method disclosed herein do not have to be performed in the exact order disclosed, unless explicitly stated or understood by the skilled person.

Corresponding computer programs (which may or may not be recorded on a carrier) for implementing one or more of the methods disclosed herein are also within the present disclosure and encompassed by one or more of the described example embodiments.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

BRIEF DESCRIPTION OF THE DRAWINGS

The embodiments of the invention are illustrated by way of example, and not by way of limitation, in the figures of the accompanying drawings:

FIG. 2 illustrates an example polygon-based map including a polygon defining a region of a weather-based hazard;

DETAILED DESCRIPTION

As discussed above, conversion of polygon-based map systems to tile-based map systems may render scenario in which one or more tiles within tile-based map systems are partially covered by polygons. To render parallelized computing for the tile-based map systems, each tile within the tile-based map systems must be labelled to provide a binary representation an event. That is, said tile must be labelled to define the event in its entirety or not define the event in its entirety. It is contemplated that if a polygon overlaps the majority of the total area of a tile, the tile is labelled to define an event. However, detailed attributes and contextual information associated with the tile must be further considered to improve the quality of the tile-based map that defines the event. Systems and methods for addressing such issue will be described in detail, herein.

Figure 1:
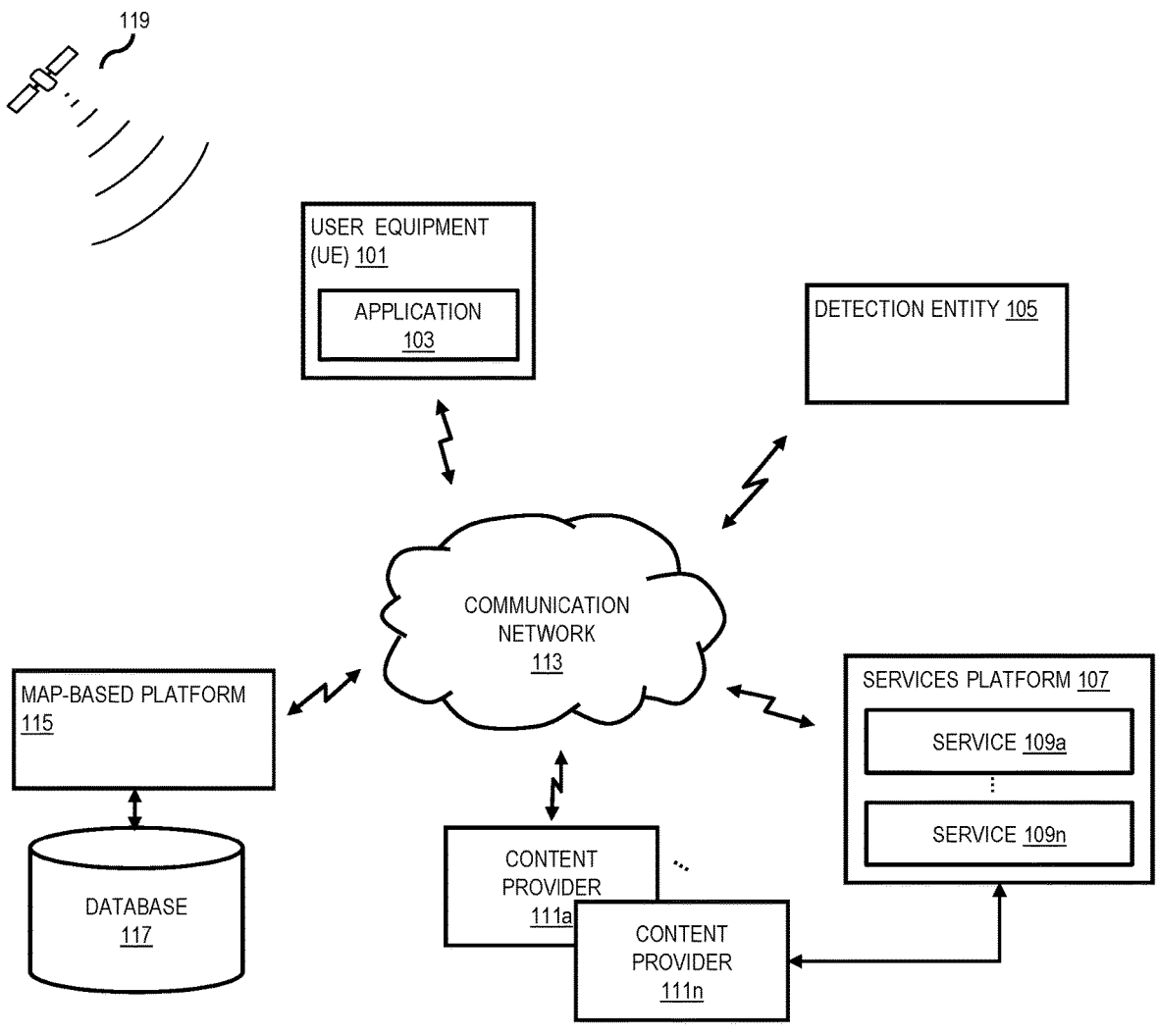
FIG. 1 illustrates a diagram of a system capable of providing a tile map including a binary representation of a weather-based hazard.

FIG. 1 is a diagram of a system 100 capable of providing a tile map including a binary representation of a weather-based hazard. The binary representation indicates whether a tile of the tile map indicates the weather-based hazard. The system includes a user equipment (UE) 101, a detection entity 105, a services platform 107, content providers 111a-111n, a communication network 113, a map-based platform 115, a database 117, and a satellite 119. Additional or a plurality of mentioned components may be provided.

In the illustrated embodiment, the system 100 comprises a user equipment (UE) 101 that may include or be associated with an application 103. In one embodiment, the UE 101 has connectivity to the map-based platform 115 via the communication network 113. The map-based platform 115 performs one or more functions associated with providing a tile map including a binary representation of a weather-based hazard. In the illustrated embodiment, the UE 101 may be any type of mobile terminal or fixed terminal such as a mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, devices associated with or integrated with a vehicle (e.g., as part of an infotainment system of the vehicle), or any combination thereof, including the accessories and peripherals of these devices. In one embodiment, the UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the UE 101 can be a cellular telephone. A user may use the UE 101 for navigation functions, for example, road link map updates. It should be appreciated that the UE 101 can support any type of interface to the user (such as "wearable" devices, etc.).

In the illustrated embodiment, the application 103 may be any type of application that is executable by the UE 101, such as a mapping application, a location-based service application, a navigation application, a content provisioning service, a camera/imaging application, a media player application, a social networking application, a calendar application, or any combination thereof. In one embodiment, one of the applications 103 at the UE 101 may act as a client for the map-based platform 115 and perform one or more functions associated with the functions of the map-based platform 115 by interacting with the map-based platform 115 over the communication network 113. The application 103 may be used receive map data, specifically, polygon-based map data, tile-based map data, or a combination thereof. The application 103 may also be used to provide information to the map-based platform 115, where said information may be used to convert polygon-based map features to tile-based map features. For example, said information may be sensor data acquired by the UE 101 (e.g., image data). The application 103 may also be used to acquire information from the map-based platform 115, such as polygon-based map information, tile-based map information, or a combination thereof.

The detection entity 105 may be a vehicle, a drone, a user equipment, a road-side sensor, or a sensory device mounted on a stationary object within or proximate to a road segment (e.g., a traffic light post, a sign post, a building, etc.). The detection entity 105 may include one or more image sensors such as electronic imaging devices of both analog and digital types, which include digital cameras, camera modules, camera phones, thermal imaging devices, radar, sonar, lidar, etc. The detection entity 105 may further include a network detection sensor for detecting wireless signals or receivers for different short-range communications (e.g., Bluetooth, Wi-Fi, Li-Fi, near field communication (NFC), etc.), temporal information sensors, an audio recorder for gathering audio data, velocity sensors, light sensors, oriental sensors augmented with height sensor and acceleration sensor, tilt sensors to detect the degree of incline or decline of the detection entity 105 along a path of travel, etc. In a further embodiment, sensors about the perimeter of the detection entity 105 may detect the relative distance of the detection entity 105 from road objects, lanes, or roadways, the presence of other vehicles, pedestrians, traffic lights, road features (e.g., curves) and any other objects, or a combination thereof. Said sensors may also detect orientations of such objects. In one embodiment, the detection entity 105 may include GPS receivers to obtain geographic coordinates from satellites 129 for determining current location and time associated with the detection entity 105. Further, the location can be determined by a triangulation system such as A-GPS, Cell of Origin, or other location extrapolation technologies. In one embodiment, the detection entity 105 may acquire weather data. The weather data may be generated in a number of ways, such as through the use of various sensors, such as anemometers, wind vanes, pressure sensors, thermometers, hygrometers, rain gauges, doppler radars, or any combination thereof to live-track the current weather readings and build a weather forecast based on the readings. In on embodiment, the detection entity 105 may further include a receiver and a transmitter for maintaining communication with the map-based platform 115 and/or other components within the system 100.

The services platform 107 may provide one or more services 109a-109n (collectively referred to as services 109), such as mapping services, navigation services, travel planning services, weather-based services, emergency-based services, notification services, social networking services, content (e.g., audio, video, images, etc.) provisioning services, application services, storage services, contextual information determination services, location-based services, information-based services, etc. In one embodiment, the services platform 107 may be an original equipment manufacturer (OEM) platform. In one embodiment the one or more services 109 may be sensor data collection services. By way of example, vehicle sensor data provided by the sensors 107 may be transferred to the UE 101, the map-based platform 115, the database 117, or other entities communicatively coupled to the communication network 113 through the service platform 107. In one embodiment, the services platform 107 uses the output data generated by of the map-based platform 115 to provide services such as navigation, mapping, other location-based services, etc.

In one embodiment, the content providers 111a-111n (collectively referred to as content providers 111) may provide content or data (e.g., including geographic data, parametric representations of mapped features, etc.) to the UE 101, services platform 107, the map-based platform 115, the database 117, or the combination thereof. In one embodiment, the content provided may be any type of content, such as map content, textual content, audio content, video content, image content, etc. In one embodiment, the content providers 111 may provide content that may aid in providing a tile map including a binary representation of a weather-based hazard, and/or other related characteristics. In one embodiment, the content providers 111 may also store content associated with the UE 101, services platform 107, the map-based platform 115, the database 117, or the combination thereof. In another embodiment, the content providers 111 may manage access to a central repository of data, and offer a consistent, standard interface to data, such as a repository of the database 117.

The communication network 113 of system 100 includes one or more networks such as a data network, a wireless network, a telephony network, or any combination thereof. The data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In the illustrated embodiment, the map-based platform 115 may be a platform with multiple interconnected components. The map-based platform 115 may include multiple servers, intelligent networking devices, computing devices, components and corresponding software for providing a tile map including a binary representation of a weather-based hazard. It should be appreciated that that the map-based platform 115 may be a separate entity of the system 100, included within the UE 101 (e.g., as part of the applications 103), included within the services platform 107 (e.g., as part of an application stored in server memory for the services platform 107), included within the content providers 111 (e.g., as part of an application stored in sever memory for the content providers 111), other platforms embodying a power supplier (not illustrated), or a combination thereof.

The map-based platform 115 embodies polygon-based map systems and tile-based map systems. The polygon-based map systems provide maps including polygons defining regions in which events, such as weather-based hazards, are occurring. A weather-based hazard may be defined by a hazardous weather condition, such as rain, snow, fog, wind, tornado, hurricane, etc. In one embodiment, a polygon may be generated based on readings acquired by sensors for detecting weather conditions that are located within different locations. For example, a plurality of detection entities 105 located within various locations may acquire readings at said locations, and the readings may be processed to generate a polygon indicating a weather-based hazard that covers said locations. In one embodiment, sensor readings acquired to generate a polygon may be acquired at the same time or within a window of timing (e.g., seconds, minutes, hours, etc.). The sensor readings may be data acquired at real-time or near real-time. In one embodiment, sensor readings may be represented as an average value over a period of time. FIG. 2 illustrates an example polygon-based map 200 including a polygon defining a region of a weather-based hazard. In the illustrated example, the polygon-based map 200 includes a five-side polygon 201, where the polygon 201 defines a region of a weather-based hazard. While polygon-based map systems detail a shape of a region of a weather-based hazard, a polygon-based map is generally processed in the entirety thereof, and the scale at which the polygon-based map can be processed is limited to the shape and dimension of the polygon.

Figure 3:
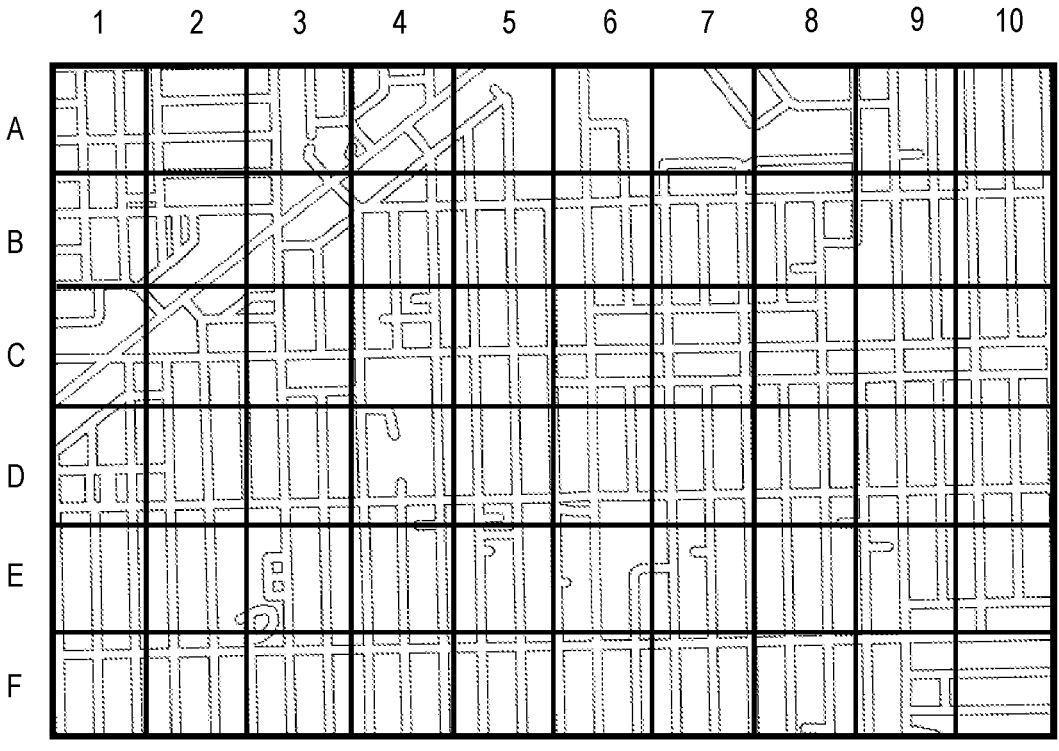
FIG. 3 illustrates an example tile-based map.
Figure 4:
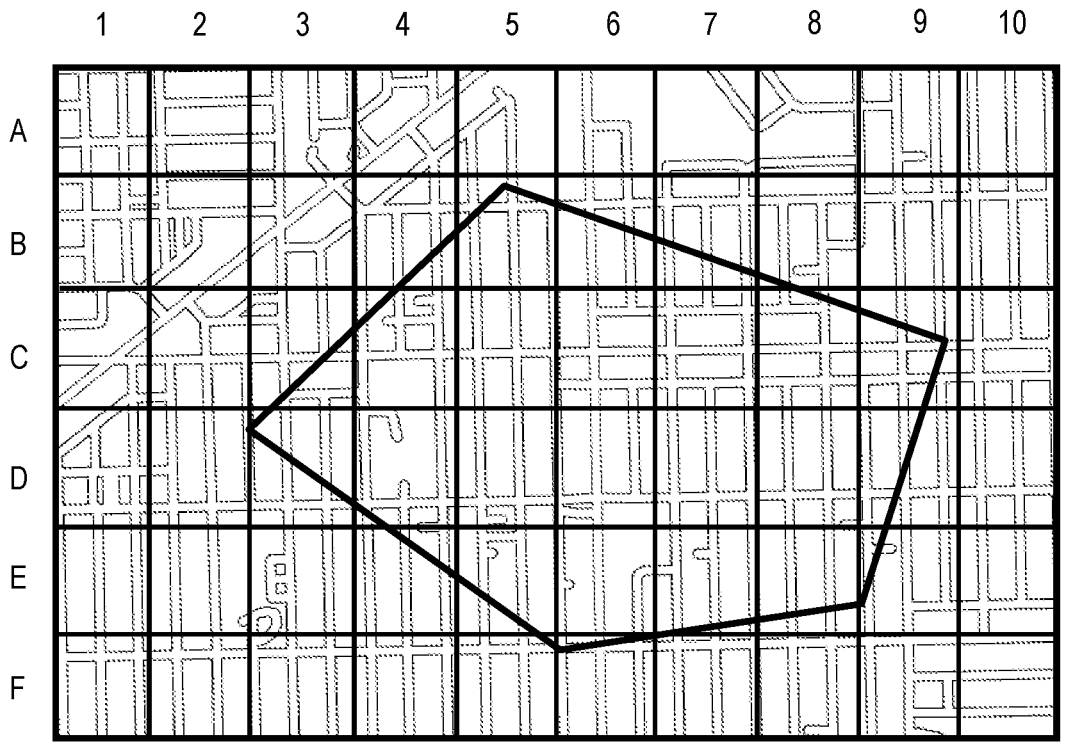
FIG. 4 illustrates the tile-based map of FIG. 3 including the polygon of the polygon-based map of FIG. 2.

The tile-based map systems provide tile maps, where each of the tile maps is partitioned into a plurality of tiles. FIG. 3 illustrates an example tile-based map 300. In the illustrated example, the tile-based map 300 includes a plurality of tiles 301, where the same map as illustrated in FIG. 2 is partitioned into the plurality of tile 301. The plurality of tiles 301 is labelled with rows A-F and columns 1-10. While the illustrated example illustrates each tile of the tile-based map 300 as having a predetermined dimension, it should be appreciated that the dimension of each tile of a tile-based map can be any length and width. One particular advantage of a tile-based map system is that a tile-based map can be readily incorporated with parallelized computing. Each tile can be simultaneously processed via a dedicated processor, and processed tiles can be united thereafter to provide a processed tile-based map. As such, the speed at which a tile-based map system can process a tile-based map is limited to a number of dedicated processors within the system that can process a number of tiles in parallel. As legacy polygon-based maps systems are transitioned into tile-based map systems, each polygon as defined in polygon-based maps are represented as one or more tiles in tile-based maps. However, the process in which polygon-based maps are converted to tile-based based maps requires each converted tile to provide a binary representation of a polygon. For example, if a polygon within a polygon-based map is overlayed on tiles of a tile-based map, there may be one or more tiles that partially includes the polygon. For each of such partial tiles, said tile must be rendered to either represent the corresponding portion of the polygon in the entirety thereof or not represent the corresponding portion of the polygon in the entirety thereof. FIG. 4 illustrates the tile-based map 300 of FIG. 3 including the polygon 201 of the polygon-based map 200 of FIG. 2. In the illustrated example, tiles C5, C6, C7, D5, D6, D7, D8, and E6 include portions of the polygon 201 in the entirety thereof. As such, tiles C5, C6, C7, D5, D6, D7, D8, and E6 are rendered to represent the weather-based hazard. However, tiles B4, B5, B6, B7, B8, C3, C4, C8, C9, D3, D4, D9, E4, E5, E7, E8, E9, F5, and F6 partially include portions of the polygon 201. As such, tiles B4, B5, B6, B7, B8, C3, C4, C8, C9, D3, D4, D9, E4, E5, E7, E8, E9, F5, and F6 are processed to determine whether such tiles will represent the weather-based hazard.

Returning to FIG. 1, the map-based platform 115 processes each tile that partially includes a portion of a polygon representing a weather-based hazard. Herein, a tile that partially includes a portion of a polygon will be referred as a partial tile. For each partial tile, the map-based platform 115 renders a tile score. In one embodiment, the tile score is determined based on a functional class score, where the functional class score is defined by one or more functional classes of one or more road portions within each partial tile. Herein, a road portion is defined by one or more road segments, one or more nodes, or a combination thereof. A functional class of a road defines a function of the road within a transportation system. In one embodiment, a functional class of a road may be described as a numerical value (e.g., 1, 2, 3, 4, and 5). Functional class 1 may be interstates while functional class 5 may be local roads. One example of a simple system includes the functional classification maintained by the United States Federal Highway administration. The simple system includes arterial roads, collector roads, and local roads. The functional classifications of roads balance between accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road. An example of a complex functional classification system is the urban classification system. Interstates include high speed and controlled access roads that span long distances. The arterial roads are divided into principle arteries and minor arteries according to size. The collector roads are divided into major collectors and minor collectors according to size. Another example functional classification system divides long distance roads by type of road or the entity in control of the highway. The functional classification system includes interstate expressways, federal highways, state highways, local highways, and local access roads. Another functional classification system uses the highway tag system in the Open Street Map (OSM) system. The functional classification includes motorways, trunk roads, primary roads, secondary roads, tertiary roads, and residential roads.

The functional class score is computed by using the following equation:

$$FC = \frac{\Sigma w_{fc\_i} * fd_{fc\_i}}{\Sigma fd_{fc\_i}} \qquad \text{[Equation 1]}$$

In Equation 1, FC is the functional class score of a given partial tile, $w_{fc\_i}$ is the weight assigned to each functional class within the partial tile, and $fd_{fc\_i}$ is the length of all road portions of said functional class within the partial tile. By way of example, assuming the following variables: weight for FC1: 0.4; weight for FC2: 0.25; weight for FC3: 0.15; weight for FC4: 0.15; weight for FC5: 0.05; length of FC1: 2 Km; length of FC2: 3 Km; length of FC3: 4 Km; length of FC4: 5 Km; and length of FC5: 8 Km, the functional class score is 0.15. In one embodiment, $w_{fc\_i}$ and $fd_{fc\_i}$ are only calculated for all road portions that are within an area of a partial tile that is covered by a polygon.

In one embodiment, weights for functional classes of road portions are assigned such that a road portion having a greater functional class is assigned a greater weight, and a road portion having a lower functional class is assigned a lower weight. A road portion having a greater functional class is assigned a with greater weight in that vehicles traveling within the road portion generally move at greater speeds than vehicles traveling within a road portion of a lesser functional class. As such, the severity of potential vehicle-related accidents that can occur within the road portion having the greater functional class is greater than vehicle-related accidents occurring with other road portions having lesser functional classes. Additionally, it is contemplated that a greater degree of traffic is generally observed at a road portion having a greater functional class than a road portion having a lesser functional class. As such, weights of road portions having greater functional classes are greater than weights of road portions having lesser functional classes.

In one embodiment, the tile score is determined based on a proportion score associated with each partial tile. The proportion score is defined by a proportion of each partial tile that is covered by a polygon. For example, if 30% of a partial tile is covered by a polygon, the proportion score is 0.3.

In one embodiment, the tile score is determined based on a road density score associated with each partial tile. The road density score is determined by: (1) identifying a map region including one or more road segments; (2) selecting multiple points from the map region; (3) from each of the selected points, measuring a distance from the selected point to a nearest road segment of the one or more road segments; and (3) using the distances. Details of deriving the road density score can be further explained in U.S. Pat. No. 9,778,061, which is incorporated herein at its entirety.

In one embodiment, the tile score is determined based on a hazard intensity score associated with each partial tile. The hazard intensity score indicates a degree of severity of a type of weather hazard condition impacting the partial tile. By way of example, if the weather hazard is defined by a rainfall, a degree of severity of the rainfall may be defined by an amount of rainfall that is occurring within a period (e.g., mm per hour). In such example, the severity can be set as follows: (1) a moderate amount of rain may be defined by an amount greater than 0.5 mm per hour, but less than 4.0 mm per hour; (2) a heavy amount of rain may be defined by an amount greater than 4 mm per hour, but less than 8 mm per hour; and (3) an extremely heavy amount of rain may be defined by an amount greater than 8 mm per hour. In such example, the hazard intensity score for the moderate amount of rain may be 0.5, the hazard intensity score for the heavy amount of rain may be 0.8, and the hazard intensity score for the extremely heavy amount of rain may be 1.0. By way of another example, if the weather hazard is defined by a fog, a degree of severity of the fog may be defined by a maximum distance of visibility within the fog condition. In such example, the severity can be set as follows: (1) a clear visibility within the fog condition may be defined by a maximum distance of visibility that is greater than 1000 meters; (2) a moderate visibility within the fog condition may be defined by a maximum distance of visibility that is between 100 meters to 1000 meters; and (3) a low visibility within the fog condition may be defined by a maximum distance of visibility that is less than 100 meters. In such example, the hazard intensity score for the clear visibility within the fog condition may be 0.5, the hazard intensity score for the moderate visibility within the fog condition may be 0.8, and the hazard intensity score for the low visibility within the fog condition may be 1.0. It is contemplated that the hazard intensity score may be defined by other types of weather hazard conditions, such as snowfall, tornado, hurricane, etc.

The tile score is computed by using the following equation:

$$T = \frac{\Sigma w_{f\_i} * s_{f\_i}}{\Sigma w_{f\_i}}$$ [Equation 2]

In Equation 2, T is the tile score of a given partial tile, $w_{f\_i}$ is the weight of each feature (i.e., functional class of road portions within the partial tile, proportion of the partial tile covered by the polygon, road density of the partial tile, or hazard intensity within the partial tile), and $s_{f\_i}$ is the score of each feature (i.e., the functional class score, the proportion score, the road density score, or the hazard intensity score). The sum of all weights of the features is equal to one. In one embodiment, the feature of functional classes of road portions within the partial tile is assigned the greatest weight in that the severity of potential accidents within the road portions having greater functional classes has the greatest impact on safety of vehicle users. Additionally, greater functional classes of road portions typically observe the most traffic. In one embodiment, the feature of proportion of the tile covered by the polygon is assigned the second greatest weight. Once the tile score is determined, map-based platform 115 compares the tile score to a threshold value. In one embodiment, the threshold value may be 0.5. As such, if a tile score of a partial tile is greater than 0.5, the partial tile is assigned to represent a weather-based hazard of a polygon that partially covers the partial tile. If the tile score of the tile is less than 0.5, the partial tile is not assigned to represent the weather-based hazard.

The map-based platform 115 uses one or more polygon-based maps, one or more tile-based maps, or a combination thereof to provide various applications. In one embodiment, the map-based platform 115 provides a navigational route to a destination by using one or more of the maps. In one embodiment, the map-based platform 115 generates a signal that enables a user equipment (e.g., UE 101) to provide a notification indicating a location of an event within a road network, such as a weather-based hazard, by using one or more of the maps. The signal may cause the user equipment to provide sound notification, display notification, vibration, or a combination thereof to indicate the presence and/or location of such event. In one embodiment, the map-based platform 115 may generate a route to a destination based on the location of the event and cause a user equipment to present the route. In such embodiment, the generated route may avoid the location of the event. In one embodiment, a polygon-based map, a tile-based map, or a combination thereof may be used to generate command signals for providing maneuver controls for an autonomous vehicle. For example, a route generated to avoid a location of a weather-based hazard may be provided to an autonomous vehicle, and the autonomous vehicle may reach a destination by using the route.

The map-based platform 115 can be implemented in hardware, firmware, software, or a combination thereof. Though depicted as a separate entity in FIG. 1, it is contemplated that the map-based platform 115 may be implemented for direct operation by the UE 101, the services platform 107, one or more of the content providers 111, or a combination thereof. As such, the map-based platform 115 may generate direct signal inputs by way of the operating system of the UE 101, the services platform 107, the one or more of the content providers 111, or the combination thereof for interacting with the applications 103. The various executions presented herein contemplate any and all arrangements and models.

In the illustrated embodiment, the database 117 stores information on road links (e.g., road length, road breadth, slope information, curvature information, geographic attributes, etc.), probe data for one or more road links (e.g., traffic density information), POIs, and other types map-related features. In one embodiment, the database 117 may include any multiple types of information that can provide means for aiding in providing a tile map including a binary representation of a weather-based hazard. It should be appreciated that the information stored in the database 117 may be acquired from any of the elements within the system 100, other vehicles, sensors, database, or a combination thereof.

In one embodiment, the UE 101, the detection entity 105, the services platform 107, the content providers 111, the map-based platform 115 communicate with each other and other components of the communication network 113 using well known, new or still developing protocols. In this context, a protocol includes a set of rules defining how the network nodes within the communication network 113 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 5:
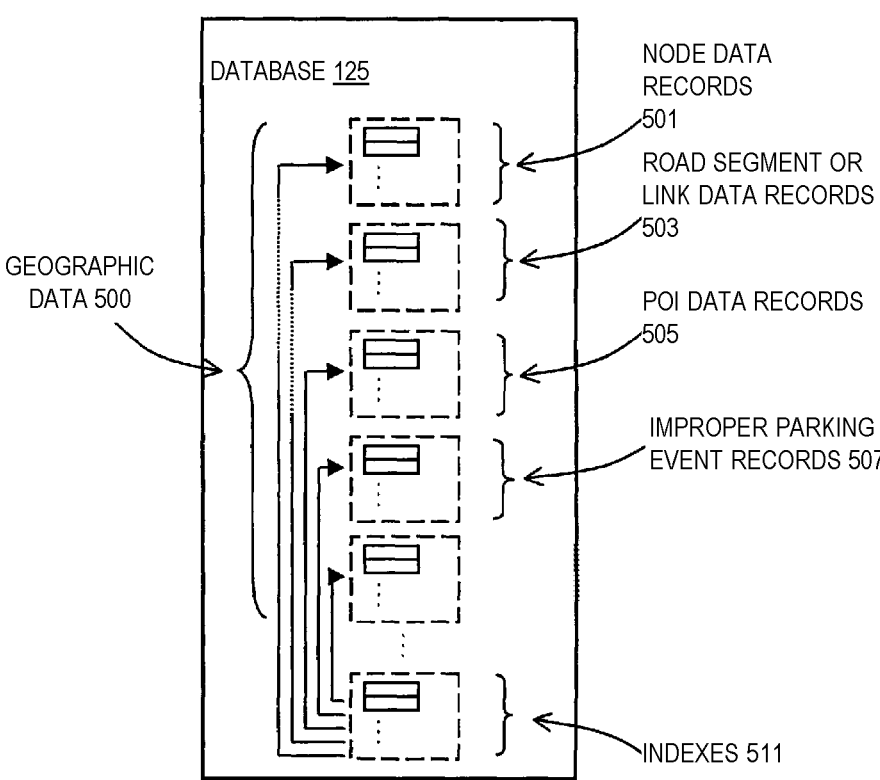
FIG. 5 illustrates a diagram of a database of FIG. 1.

FIG. 5 is a diagram of a database 117 (e.g., a map database), according to one embodiment. In one embodiment, the database 117 includes data 200 used for (or configured to be compiled to be used for) mapping and/or navigation-related services, such as for personalized route determination, according to exemplary embodiments.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions, models, routes, etc. Accordingly, the terms polygons and polygon extrusions/models as used herein can be used interchangeably.

In one embodiment, the following terminology applies to the representation of geographic features in the database 117.

"Node"—A point that terminates a link.

"Line segment"—A line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the database 117 follows certain conventions. For example, links do not cross themselves and do not cross each other except at a node or vertex. Also, there are no duplicated shape points, nodes, or links. Two links that connect each other have a common node or vertex. In the database 117, overlapping geographic features are represented by overlapping polygons. When polygons overlap, the boundary of one polygon crosses the boundary of the other polygon. In the database 117, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

In one embodiment, the database 117 is presented according to a hierarchical or multi-level tile projection. More specifically, in one embodiment, the database 117 may be defined according to a normalized Mercator projection. Other projections may be used. In one embodiment, a map tile grid of a Mercator or similar projection can a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grids. Because of the numbering system, the exact position of any tile in any level of the map tile grid or projection may be uniquely determined from the tile ID.

As shown, the database 117 includes node data records 501, road segment or link data records 503, POI data records 505, map conversion data 507, and indexes 511, for example. More, fewer or different data records can be provided. In one embodiment, additional data records (not shown) can include cartographic ("carto") data records, routing data, and maneuver data. In one embodiment, the indexes 511 may improve the speed of data retrieval operations in the database 117. In one embodiment, the indexes 511 may be used to quickly locate data without having to search every row in the database 117 every time it is accessed.

In exemplary embodiments, the road segment data records 503 are links or segments representing roads, streets, or paths, as can be used in the calculated route or recorded route maneuver information for determination of one or more personalized routes. The node data records 501 are end points (such as intersections) corresponding to the respective links or segments of the road segment data records 503. The road link data records 503 and the node data records 501 represent a road network, such as used by vehicles, cars, and/or other entities. Alternatively, the database 117 can contain path segment and node data records or other data that represent pedestrian paths or areas in addition to or instead of the vehicle road record data, for example. In one embodiment, the road or path segments can include an altitude component to extend to paths or road into three-dimensional space (e.g., to cover changes in altitude and contours of different map features, and/or to cover paths traversing a three-dimensional airspace).

Links, segments, and nodes can be associated with attributes, such as geographic coordinates, a number of road objects (e.g., road markings, road signs, traffic light posts, etc.), types of road objects, traffic directions for one or more portions of the links, segments, and nodes, traffic history associated with the links, segments, and nodes, street names, address ranges, speed limits, turn restrictions at intersections, presence of roadworks, and other navigation related attributes, as well as POIs, such as gasoline stations, hotels, restaurants, museums, stadiums, offices, automobile dealerships, auto repair shops, factories, buildings, stores, parks, etc. The database 117 can include data about the POIs and their respective locations in the POI data records 205. The database 117 can also include data about places, such as cities, towns, or other communities, and other geographic features, such as bodies of water, mountain ranges, etc. Such place or feature data can be part of the POI data records 505 or can be associated with POIs or POI data records 505 (such as a data point used for displaying or representing a position of a city).

The map conversion data 507 include data for converting one type of map to another type of map. By way of example, such data may be suitable for converting a polygon-based map to a tile-based map. The data may include the algorithm as described with respect to the map-based platform 115 for rendering a comparison between a polygon-based map to a tile-based map, identifying one or more partial tiles, and using features/attributes associated with said partial tiles to determine whether said tiles should indicate a weather-based hazard as represented by the polygon that overlaps said tiles.

In one embodiment, the database 117 can be maintained by the services platform 107 and/or one or more of the content providers 111 in association with a map developer. The map developer can collect geographic data to generate and enhance the database 117. There can be different ways used by the map developer to collect data. These ways can include obtaining data from other sources, such as municipalities or respective geographic authorities. In addition, the map developer can employ field personnel to travel by vehicle along roads throughout the geographic region to observe attributes associated with one or more road segments and/or record information about them, for example. Also, remote sensing, such as aerial or satellite photography, can be used.

The database 117 can be a master database stored in a format that facilitates updating, maintenance, and development. For example, the master database or data in the master database can be in an Oracle spatial format or other spatial format (e.g., accommodating different map layers), such as for development or production purposes. The Oracle spatial format or development/production database can be compiled into a delivery format, such as a geographic data files (GDF) format. The data in the production and/or delivery formats can be compiled or further compiled to form database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received database in a delivery format to produce one or more compiled navigation databases.

The processes described herein for providing a tile map including a binary representation of a weather-based hazard may be advantageously implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof.

Figure 6:
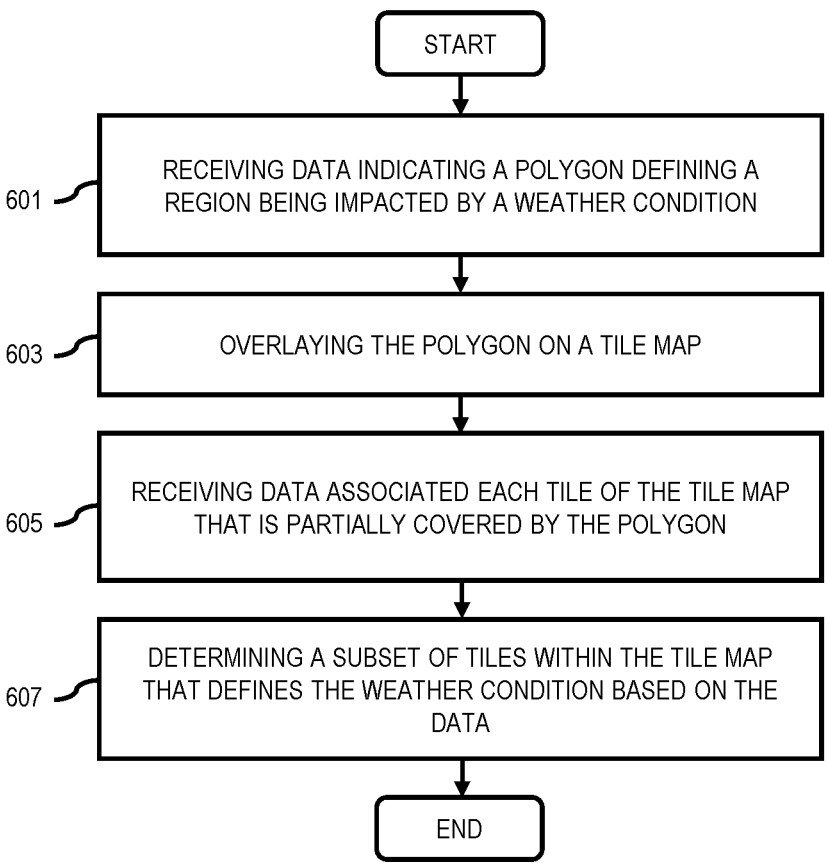
FIG. 6 illustrates a flowchart of a process for providing a tile map including a binary representation of a weather-based hazard.
Figure 8:
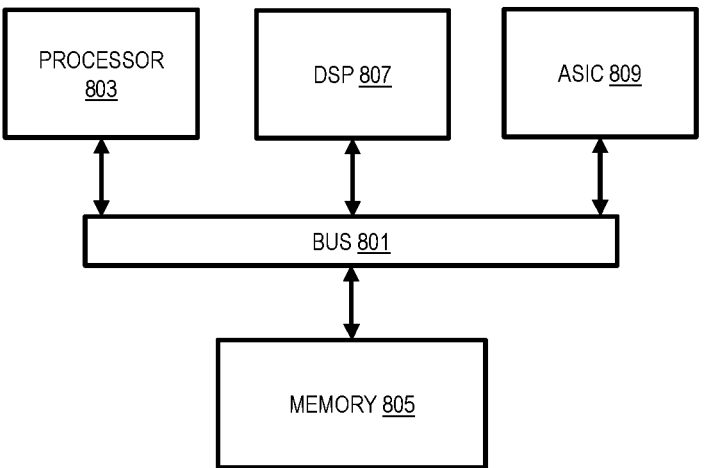
FIG. 8 illustrates a chip set or chip upon which an embodiment may be implemented.

FIG. 6 is a flowchart of a process 600 for providing a tile map including a binary representation of a weather-based hazard, according to one embodiment. In one embodiment, the map-based platform 115 performs the process 600 and is implemented in, for instance, a chip set including a processor and a memory as shown in FIG. 8.

At step 601, the map-based platform 115 receives data indicating a polygon defining a region being impacted by a weather condition. The polygon may be defined by various sensor readings acquired by various sensors disposed at various locations within the region. The weather condition may be a hazardous weather condition such as heavy rain, snow, fog, tornado, hurricane, etc.

At step 603, the map-based platform 115 overlays the polygon on a tile map. The polygon may be positioned and oriented on the tile map to reflect the region on the tile map.

At step 605, the map-based platform 115 receives data associated with each tile of the tile map that is partially covered by the polygon. The data may indicate: (1) one or more functional classes of one or more road portions within each tile of the tile map that is partially covered by the polygon; (2) a proportion of each tile that is partially covered by the polygon; (3) a road density of each tile that is partially covered by the polygon; and (4) a hazard intensity of each tile that is partially covered by the polygon (i.e., sensor data indicating an intensity level of the weather condition from a sensor located within said tile).

At step 607, the map-based platform 115 determines a subset of tiles within the tile map that defines the weather condition based on the data. Specifically, the map-based platform 115 derives a functional class score, a proportion score, a road density score, and a hazard intensity score from the data and uses the scores to calculate a tile score. The functional class score is calculated as a function of one or more weights of one or more functional classes within each tile of the tile map that is partially covered by the polygon and one or more lengths of one or more road portions having the one or more functional classes within said tile. The proportion score is calculated as a function of a percentage of the area of said tile. The road density score is determined by: (1) identifying a map region including one or more road segments; (2) selecting multiple points from the map region; (3) from each of the selected points, measuring a distance from the selected point to a nearest road segment of the one or more road segments; and (3) using the distances. The hazard intensity score is determined based on a degree of severity of a type of weather hazard condition impacting the partial tile. If the tile score of a partial tile is greater than a non-zero threshold, the tile is defined as a part of the subset, and if the tile score is less than the non-zero threshold, the tile is not defined as a part of the subset.

The system, apparatus, and methods described herein is capable of converting one or more tiles of a tile map that is partially covered by a polygon representing a weather-based hazard from a polygon-based map, thereby improving the accuracy and emphasizing the importance of the weather-based hazard tiles as represented within the tile map. Additionally, since the system, apparatus, and methods provide greater weights to road portions having greater functional classes within partial tiles for calculating tile scores, safety for vehicles traversing said road portions can be increased, and the relevancy of weather-based hazard information generated within tile maps apply to a larger population of drivers and vehicle occupants within a road network.

The processes described herein may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
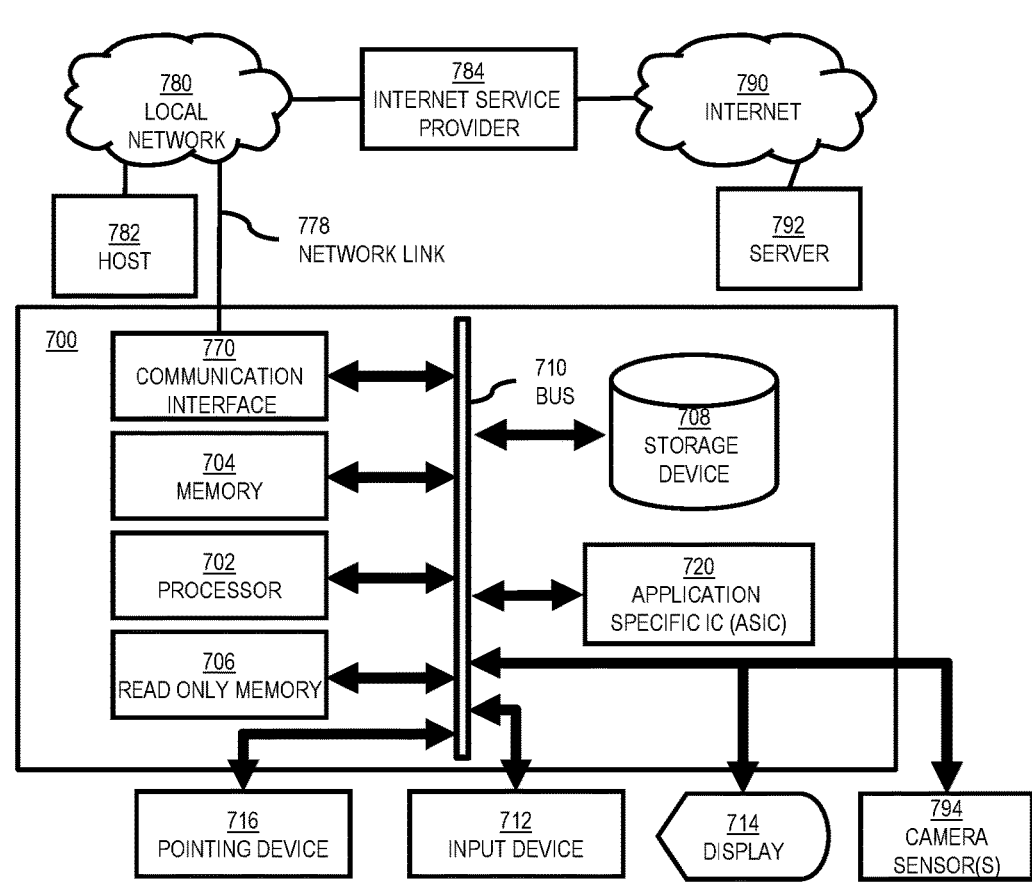
FIG. 7 illustrates a computer system upon which an embodiment may be implemented.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide a tile map including a binary representation of a weather-based hazard as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing a tile map including a binary representation of a weather-based hazard.

A bus 710 includes one or more parallel conductors of information so that information is transferred quickly among devices coupled to the bus 710. One or more processors 702 for processing information is coupled with the bus 710.

A processor (or multiple processors) 702 performs a set of operations on information as specified by computer program code related to providing a tile map including a binary representation of a weather-based hazard. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 700 also includes a memory 704 coupled to bus 710. The memory 704, such as a random access memory (RAM) or any other dynamic storage device, stores information including processor instructions for providing a tile map including a binary representation of a weather-based hazard. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 77 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing a tile map including a binary representation of a weather-based hazard, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714, and one or more camera sensors 794 for capturing, recording and causing to store one or more still and/or moving images (e.g., videos, movies, etc.) which also may comprise audio recordings. In some embodiments, for example, in embodiments in which the computer system 700 performs all functions automatically without human input, one or more of external input device 712, display device 714 and pointing device 716 may be omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 113 for providing a tile map including a binary representation of a weather-based hazard to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 782 connected to the Internet hosts a process that provides a service in response to information received over the Internet. For example, server host 782 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 782 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to provide a tile map including a binary representation of a weather-based hazard as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of providing a tile map including a binary representation of a weather-based hazard.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real-time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors. The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide a tile map including a binary representation of a weather-based hazard. The memory 805 also stores the data associated with or generated by the execution of the inventive steps.

Figure 9:
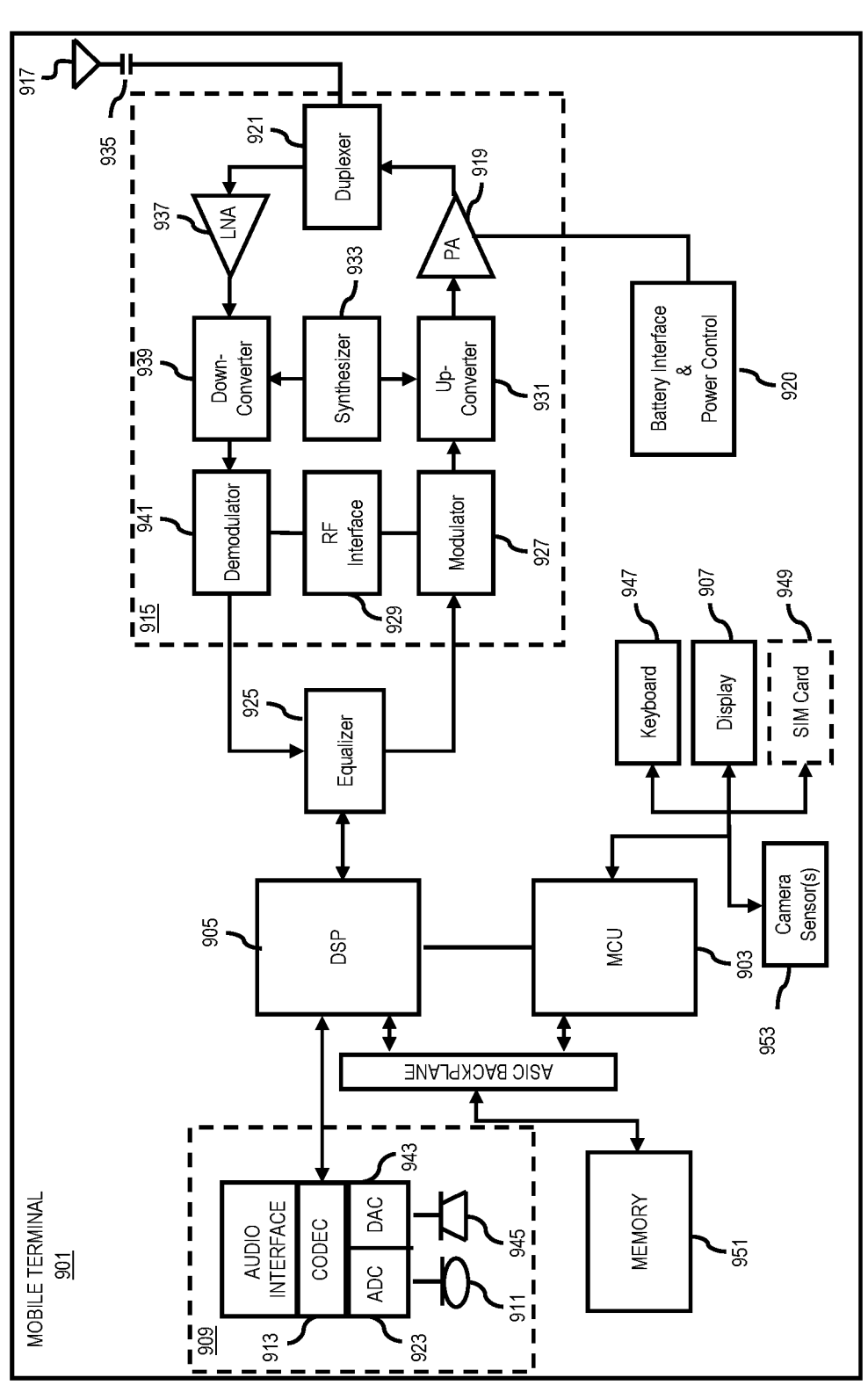
FIG. 9 illustrates a diagram of exemplary components of a mobile terminal for communications, which is capable of operating in the system of FIG. 1.

FIG. 9 is a diagram of exemplary components of a mobile terminal 901 (e.g., a mobile device or vehicle or part thereof) for communications, which is capable of operating in the system of FIG. 1, according to one embodiment. In some embodiments, mobile terminal 901, or a portion thereof, constitutes a means for performing one or more steps of providing a tile map including a binary representation of a weather-based hazard. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing a tile map including a binary representation of a weather-based hazard. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide a tile map including a binary representation of a weather-based hazard. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

Further, one or more camera sensors 953 may be incorporated onto the mobile station 901 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

We claim:

1. An apparatus comprising at least one processor and at least one non-transitory memory including computer program code instructions, the computer program code instructions configured to, when executed, cause the apparatus to:
    receive data indicating a polygon defining a region being impacted by a weather condition;
    overlay the polygon on a tile map; and
    subsequent to overlaying the polygon on the tile map:
        identify each tile of the tile map that is partially covered by the polygon;
        receive attribute data indicating one or more road portions within said tile, wherein the attribute data indicate a road density level of said tile;
        for said tile, determine a tile score based on the attribute data, wherein the tile score increases as the road density level increases;
        responsive to the tile score being above a non-zero threshold, include said tile within a subset of tiles within the tile map that defines the weather condition; and
        responsive to the score being lower than the non-zero threshold, exclude said tile from the subset.

2. The apparatus of claim 1, wherein the one or more road portions is within an area of said tile that is covered by the polygon.

3. The apparatus of claim 2, wherein, to determine the subset, the computer program code instructions are further configured to, when executed, cause the apparatus to:
    determine a length of each of the one or more road portions;
    determine a type of each of one or more functional classes of the one or more road portions;
    determine a weight of each of the one or more functional classes based on the type; and
    determine the tile score based further on the length and the weight.

4. The apparatus of claim 3, wherein, among the one or more functional classes, a functional class type providing a greater degree of mobility for vehicles is assigned with a greater weight, wherein the tile score increases as the weight increases.

5. The apparatus of claim 1, wherein the computer program code instructions are further configured to, when executed, cause the apparatus to:

receive sensor data indicating an intensity level of the weather condition from a sensor located within said tile; and determine the tile score based further on the intensity level, wherein the tile score increases as the intensity level increases.

6. A method of providing a tile map, the method comprising:

receiving data indicating a polygon defining a region being impacted by a weather condition;

overlaying the polygon on the tile map; and subsequent to overlaying the polygon the tile map:

identifying each tile of the tile map that is partially covered by the polygon;

determining a length of each of one or more road portions within said tile;

determining a functional class of each of the one or more road portions;

determining a weight of the functional class, wherein the weight increases as a degree of traffic accommodated by a road type of the functional class increases;

determining a tile score of said tile map based on the length and the weight;

responsive to the tile score being above a non-zero threshold, including said tile within a subset of tiles within the tile map that defines the weather condition;

responsive to the score being lower than the non-zero threshold, excluding said tile from the subset; and generating a signal that provides the subset on a user interface.

7. The method of claim 6, wherein the one or more road portions is within an area of said tile that is covered by the polygon.

8. The method claim 6, further comprising:

receiving sensor data indicating an intensity level of the weather condition from a sensor located within said tile; and determining the tile score based further on the intensity level.

9. A non-transitory computer-readable storage medium having computer program code instructions stored therein, the computer program code instructions, when executed by at least one processor, cause the at least one processor to:

receive data indicating a polygon defining a region being impacted by a weather condition;

overlay the polygon on a tile map; and subsequent to overlaying the polygon on the tile map:

identify each tile of the tile map that is partially covered by the polygon;

receive attribute data indicating one or more road portions within said tile, wherein the attribute data indicate a road density level of said tile;

for said tile, determine a tile score based on the attribute data, wherein the tile score increases as the road density level increases;

responsive to the tile score being above a non-zero threshold, include said tile within a subset of tiles within the tile map that defines the weather condition; and responsive to the score being lower than the non-zero threshold, exclude said tile from the subset.

10. The non-transitory computer-readable storage medium of claim 9, wherein the one or more road portions is within an area of said tile that is covered by the polygon.

11. The non-transitory computer-readable storage medium of claim 10, wherein, to determine the subset, the computer program code instructions are further configured to, when executed, cause the apparatus to:

determine a length of each of the one or more road portions;

determine a type of each of one or more functional classes of the one or more road portions;

determine a weight of each of the one or more functional classes based on the type; and determine the tile score based further on the length and the weight.

12. The non-transitory computer-readable storage medium of claim 11, wherein, among the one or more functional classes, a functional class type providing a greater degree of mobility for vehicles is assigned with a greater weight, wherein the tile score increases as the weight increases.

13. The non-transitory computer-readable storage medium of claim 9, wherein the computer program code instructions are further configured to, when executed, cause the apparatus to:

receive sensor data indicating an intensity level of the weather condition from a sensor located within said tile; and determine the tile score based further on the intensity level, wherein the tile score increases as the intensity level increases.

* * * * *